United States Patent
Kultanen

(10) Patent No.: US 10,226,027 B2
(45) Date of Patent: Mar. 12, 2019

(54) BRUSH DEVICE FOR ANIMALS

(71) Applicant: Juha Kultanen, Suhmura (FI)

(72) Inventor: Juha Kultanen, Suhmura (FI)

(*) Notice: Subject to any disclaimer, the term of this patent is extended or adjusted under 35 U.S.C. 154(b) by 0 days.

(21) Appl. No.: 15/565,598

(22) PCT Filed: Apr. 4, 2016

(86) PCT No.: PCT/FI2016/050206
§ 371 (c)(1),
(2) Date: Oct. 10, 2017

(87) PCT Pub. No.: WO2016/162596
PCT Pub. Date: Oct. 13, 2016

(65) Prior Publication Data
US 2018/0110203 A1 Apr. 26, 2018

(30) Foreign Application Priority Data
Apr. 7, 2015 (FI) ................................. 20150106

(51) Int. Cl.
*A01K 13/00* (2006.01)
*A46B 5/00* (2006.01)

(52) U.S. Cl.
CPC .......... *A01K 13/004* (2013.01); *A01K 13/002* (2013.01); *A46B 5/0058* (2013.01); *A46B 5/0091* (2013.01); *A46B 2200/1093* (2013.01)

(58) Field of Classification Search
CPC .... A01K 13/004; A01K 13/00; A01K 13/001; A01K 13/003
USPC ....... 119/608, 609, 621, 602, 650, 652, 656; 15/53.3
See application file for complete search history.

(56) References Cited

U.S. PATENT DOCUMENTS

| 3,175,537 A | * | 3/1965 | Paul | A01K 13/004 |
|---|---|---|---|---|
| | | | | 119/656 |
| 4,935,982 A | * | 6/1990 | Ennis | B60S 3/063 |
| | | | | 15/53.3 |
| 5,511,272 A | * | 4/1996 | Belanger | B60S 3/063 |
| | | | | 15/53.3 |

(Continued)

FOREIGN PATENT DOCUMENTS

| CA | 2804975 A1 | * | 1/2012 | ........... A01K 13/004 |
|---|---|---|---|---|
| CN | 202 179 027 U | | 4/2012 | |

(Continued)

OTHER PUBLICATIONS

Jun. 29, 2016 International Search Report issued in International Patent Application No. PCT/FI2016/050206.

(Continued)

*Primary Examiner* — Yvonne R Abbott-Lewis
(74) *Attorney, Agent, or Firm* — Oliff PLC

(57) ABSTRACT

A brush device for animals without an actuator connected to the brush device, which is intended for fixed installation in the construction of an animal shed for animals to use independently, including a base for fastening the brush device to a wall, a column or some other structure, a pendulum frame diverging from the base made such that it extends out of the base and to it is fastened a bristle section against which animals rub up. Between the base and the pendulum frame diverging from it, there is a joint which enables the pendulum-like rotational motion of a brush section around a rotation axis.

9 Claims, 2 Drawing Sheets

(56) References Cited

U.S. PATENT DOCUMENTS

| | | |
|---|---|---|
| 2003/0209209 A1 | 11/2003 | Udelle et al. |
| 2004/0237232 A1* | 12/2004 | Ennis ................. B60S 3/063 15/53.2 |
| 2009/0145370 A1 | 6/2009 | Sullivan et al. |
| 2014/0090607 A1 | 4/2014 | Dole et al. |

FOREIGN PATENT DOCUMENTS

| | | | |
|---|---|---|---|
| DE | 25 16 076 A1 | 10/1976 | |
| DE | 296 09 477 U1 | 9/1996 | |
| DE | 197 34 289 C1 | 11/1998 | |
| EP | 0 287 176 A1 | 10/1988 | |
| EP | 1 665 927 A2 | 6/2006 | |
| EP | 1665927 A2 * | 6/2006 | ........... A01K 13/004 |
| EP | 2422617 A2 * | 2/2012 | ........... A01K 13/004 |
| NL | 8006941 A | 7/1982 | |
| WO | 2010/040631 A1 | 4/2010 | |
| WO | WO-2010040631 A1 * | 4/2010 | ........... A01K 13/004 |

OTHER PUBLICATIONS

Sep. 21, 2018 Extended Search Report issued in European Patent Application No. 16776178.2.

* cited by examiner

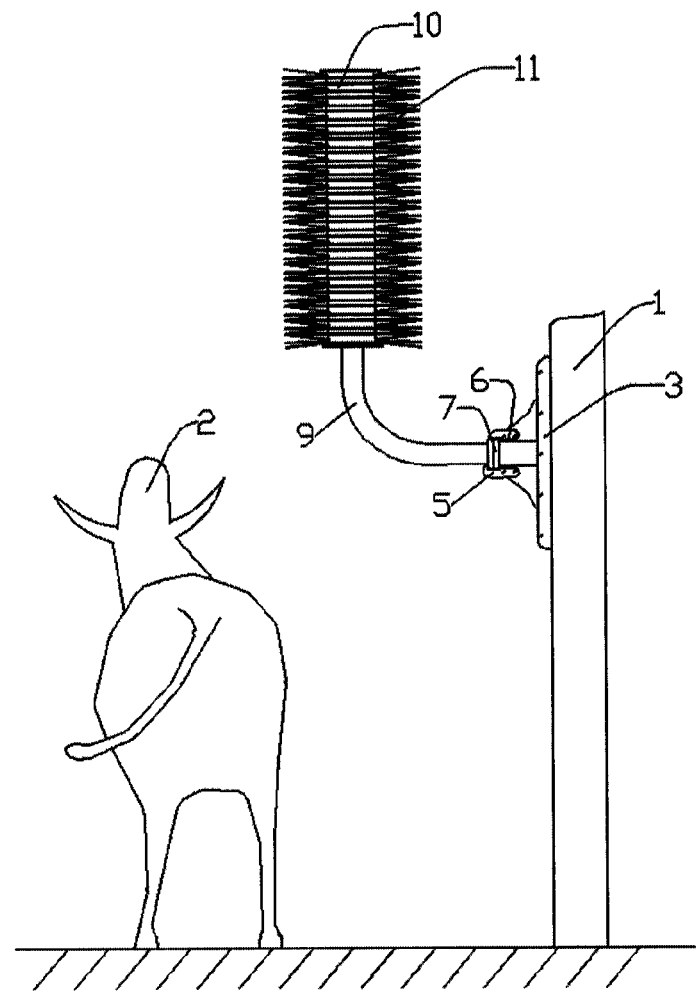
FIG. 3
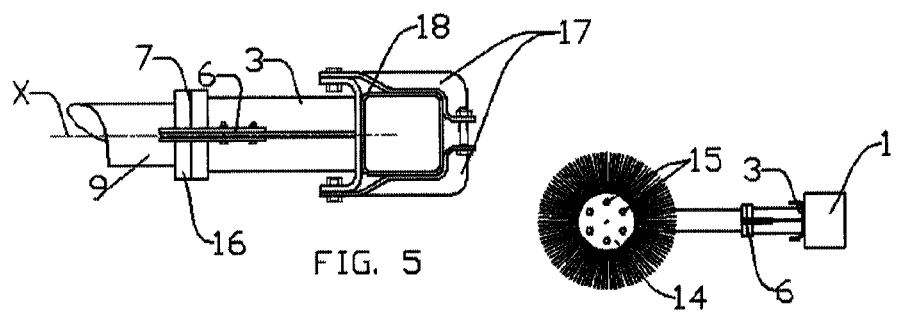
FIG. 5
FIG. 4

BRUSH DEVICE FOR ANIMALS

The invention relates to a brush device, fixedly installable in an animal shed or outdoors, intended for brushing independently by animals, without an actuator connected to the brush device, which brush device is intended for installation in the construction of the animal shed for the animals to use independently, comprising a base for fastening the brush device to a wall, a column or some other structure, a pendulum frame diverging from the base made such that it extends out of the base and to it is fastened a bristle section against which animals rub up.

It is known that, when behaving species-specifically, animals tend their coat by rubbing or licking it. There have been installed various brush devices for the use of domestic or production animals or coat tending has been done by humans as handiwork.

Known brush devices intended for animal sheds, simple of their action and affordable of their price are installable to be stationary in a wall or some other structure. With these models, the animal is not able to rub itself up against the device from every side.

Previously known are also such devices in which an attachment, such as a horizontal brush with a handle which is provided e.g. with a spring to prevent excess torsional moment in the fastening point, has been added to the above-mentioned fixed brush. These devices require a certain installation height related to the size of the animal and, thus, are not suitable for a shed having animals of various sizes or e.g. for a shed in which a calf grows into an adult. These models have also shown to be weak and short-lived of their construction.

Previously known are also automated brush devices provided with a motor and rotating of their brush section. They require an energy supply, various sensor and identification technology and control automatics. These issues make the brush device considerably expensive to manufacture and install and fault-sensitive in the conditions of animal sheds and in animal use.

The usefulness of brush devices to animals has been shown in many studies conducted in Finland and other countries.

A possibility arranged for animals to tend their coat decreases animal stress and makes animals calmer. Due to this, growth speed or milk production, for instance, have increased. When animals use their time with the brush device, the other fixtures in the animal shed are saved from animal rubbing and treatment.

Regulations on protection of animals require that the animals must have a possibility to behave species-specifically. For example, there is no known brush device for cattle feed lots or growing stalls which device would endure in the stall structures and the round-the-clock treatment of a herd.

A dirty coat and especially possible gluing of manure in the coat, the so-called manure plaque, causes additional costs for abattoirs which are charged from the animal breeder, whereby the possibility of animals to tend their coat provides economic profitability also from this viewpoint.

The object of this invention is to introduce a brush device for animals to use in independent brushing, by means of which, the above-mentioned problems are solved.

The object of the invention is provided with a brush device which is characterised by what is presented in claim 1.

The brush device according to the invention is characterised by that there is between its base and a pendulum frame diverging from it a joint which enables the pendulum-like rotational motion of a brush section around a rotation axis.

In an advantageous embodiment of the brush device according to the invention, bending resistance of the pendulum frame is so high that animals using the brush device cannot enforce its deformation, and the pendulum frame is designed such that a brush frame fastened as its extension seeks clearly observed its way gravitationally downwards in free rotation. As the brush section hangs gravitationally downwards, the animal can brush itself on the bristle section and, due to the joint, the animal has a possibility to turn the brush section horizontal by its own force and the animal has thus a possibility brush its back on the bristle section.

The brush device according to the invention has no actuator, such as a motor, for rotating the bristle section, whereby it does not need an external energy source. It is simple of its construction, its installation is made easy, the structure is strong, and the pendulum feature decreases the transfer of torsional momentum to the construction to which it has been fastened.

The brush device has little moving and thus wearing parts, whereby it is durable in the use of even large animals. The simple construction makes it safe, whereby e.g. the winding of a horse's tail or bristles in the brush device is not possible. Still, its pendulum feature enables the fact that animals of various sizes can brush themselves, also their backs, with the same brush device. Compared with known brush devices, the brush device according to the invention has several considerable advantages.

The brush device, onto which the animal brushes itself without requiring an electrical etc. connection, enables easy, safe and cost-effective installation for the outdoor and indoor locations of animals. When the brush device has no electrical etc. components, the manufacturing cost is smaller and, thus, the retail price is affordable.

The pendulum feature in relation to only one axis and the simple, strong construction enable the fact that the brush device gives resistance when the animal rubs itself up against the brush device. Hence, the bristles can be stiffer and more durable than usual and, still, the animal can itself adjust the intensity of rubbing. Equivalently due to these properties, the brush device can be installed for the use of the largest of animals, even those weighing 1,000 kilograms, without a risk of the brush device or the constructions breaking.

The functionality, manufacturing materials and construction of the brush device according to the invention also enable the fact that the device can be located in a cold environment. When outdoors, the brush device does not require any kind of weather protection.

The brush device has the inventive property of the brush section, when turned up, being lockable in the upper position, whereby the floor section below the brush is freed e.g. for mechanical cleaning.

Next, the brush device according to the invention and its particulars and advantages will be depicted in more detail with reference to the attached drawing into which the invention will not however be limited. In the drawing:

FIG. 1 shows a side view of a brush device according to the invention fastened to a wall or column structure, a bristle section hanging gravitationally downwards;

FIG. 2 shows a front view of the brush device in accordance with FIG. 1 in another position in which an animal has lifted a pendulum-like jointed brush section horizontal in order to rub its back. In this case, the device is fastened to a column, whereby the animal has a possibility to be crosswise in relation to the bristle section; in the case of wall-fastening, the animal equivalently saunters parallel with the horizontal bristle section;

FIG. 3 shows a side view of a brush device according to the invention the brush section being locked in the upper position e.g. for mechanical cleaning of the floor;

FIG. 4 shows a top view of the brush device in accordance with FIG. 3 the brush section being locked in the upper position;

FIG. 5 shows a top view in a larger scale of a base of the brush device according to the invention as it is fastened by special fasteners to a square hollow section.

Figure 1:
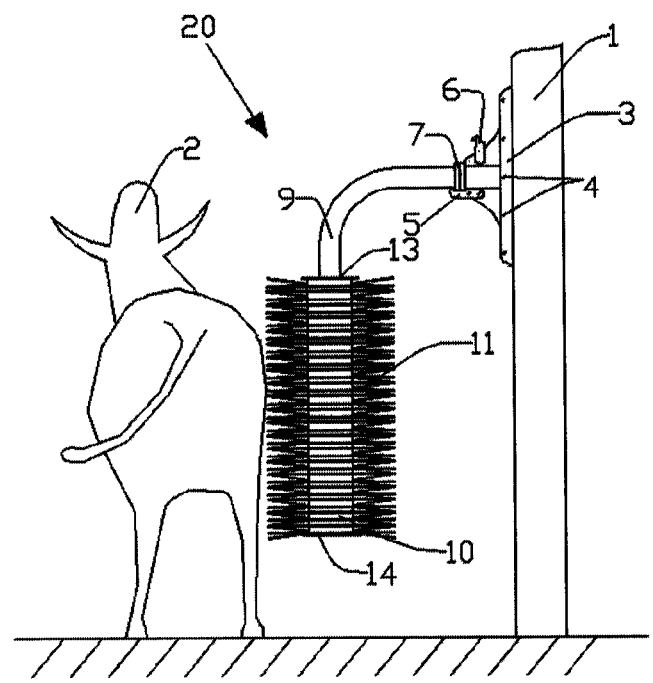

The brush device according to the figures comprises a base 3, a pendulum frame 9, a brush frame 10, a bristle section 11, a locking catch 5, and an up-turning catch 6. The drawing (FIGS. 1-3) shows an animal 2 to clarify the use situation of the brush device.

The bristle section 11 consists of a separate bristle drum where bristles are fastened to a commonly plastic uniform frame of cylindrical shape or, equivalently, it is formed of several bristle discs, the so-called bristle lamellas, set one after the other.

In the drawing, designation 20 refers to the totality of the brush section of the device. The brush section 20 comprises the pendulum frame 9, the brush frame 10 and the bristle section 11.

Figure 2:
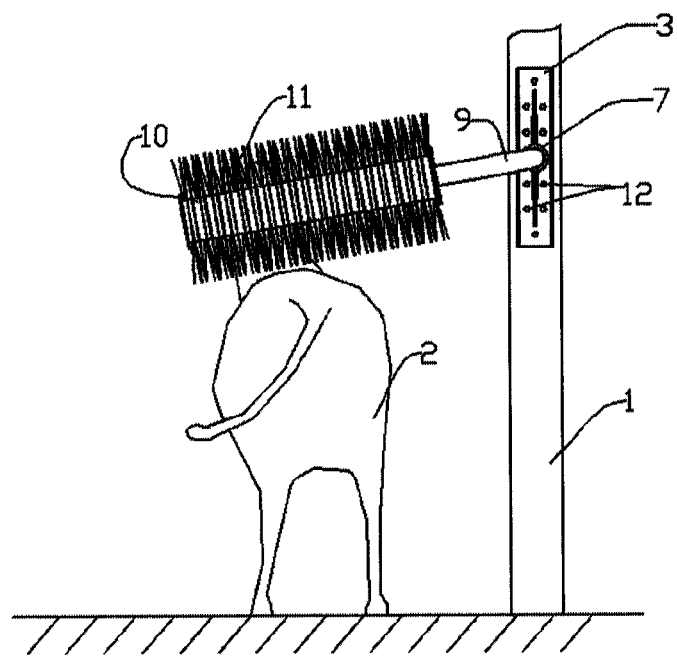

The base 3 is manufactured of metal. By means of the base, the brush device is fastened to a desired construction by means of fastening holes 12 (FIG. 2). On the side of the base 3, there are installation holes 4 (FIG. 1) for special fasteners installable as accessories, e.g. for fastening the brush device to a steel or wooden column. In the enlarged figure (FIG. 5), the base 3 is fastened to a square hollow section 18 by means of special fasteners 17 fastenable to the base 3.

Between the base 3 and the pendulum frame 9, there is a joint 7 enabling the pendulum-like rotation and/or limitless rotation of the brush section 20 around a rotation axis X (FIG. 5). The joint 7 is advantageously provided as a slide bearing such that the tubular pendulum frame 9 is rotary cut of its slide bearing length and bent into shape. A sleeve of the base 3 having being cast or welded to it, being larger of its diameter, has been machined by a suitable bearing tolerance fitting for the pendulum frame 9.

The release of the brush section 20 from the base 3 is prevented by a locking catch 5 fastened to it, the shaped paw of which is set behind a recess 16 (FIG. 5) in the pendulum frame 9 such that the brush section 20 is able to freely rotate around the rotation axis X (FIG. 5).

An up-turning catch 6 enables that the brush section 20, when turned to the upper position, can be locked (FIG. 3). When locking to the upper position, the nose of the up-turning catch 6 having been fastened pendulum-like to the base 3 sets to a hole or an opening in the pendulum frame 9 and the locking is ensured by a lock pin or bolt fastening.

If no permanently lubricated or maintenance-free parts are used in the joint 7 between the base 3 and the pendulum frame 9, the base 3 also includes a grease nipple or some other system for lubrication.

The pendulum frame 9 is manufactured of metal and such of its shape that it cannot cause cuts to animals or damage them or bystanders. Most advantageously, the pendulum frame 9 is a circular pipe or bar bent advantageously between 45-135 degrees from the straight angle. Its diameter and wall thickness are determined on the type of animals which will use the brush device. The pendulum frame 9 must endure the treatment of animals without changing shape.

The purpose of the brush frame 10 is to fasten the bristle section 11 to the pendulum frame 9. It can advantageously be an extension of the pendulum frame 9 without a connection if the middle hole of the bristle section 11 so allows. Usually, the diameter or profile of the middle hole of the bristle section 11 requires a separate brush frame 10.

If the pendulum frame 9 and the brush frame 10 are of different profiles or of different diameters, they are most advantageously connected together e.g. by welding.

The shape and the diameter of the brush frame 10 are in accordance with the middle hole of the bristle section 11 installed into it, e.g. square 45×45 mm or circular having the diameter of e.g. 175 mm.

At the top section of the brush frame 10, there will be an end stop 13 (FIG. 1) which can be e.g. a plate welded at the upper end of the brush frame. The distance of the end stop 13 from the lower end of the brush frame 10 is determined by the length of the bristle section 11 consisting of the length of the bristle drum or, when using bristle lamellas, of their number. The bristle drum or bristle lamellas of the bristle section 11 are installed via the lower end of the brush frame 10 and tensioned against the end stop 13 by a tension plate 14 by a screw fastening 15 (FIG. 4).

The bristle drum or bristle lamellas of the bristle section 11 can be e.g. products used for brushing streets and roads. They are cost-effective and generally of frost-durable plastic material polypropylene. The metal parts are of stainless materials or the metal parts are corrosion-protected e.g. by zinc coating.

The joint 7 between the base 3 and the pendulum frame 9 can be fixedly bearing-mounted, whereby no separate locking 5 of the pendulum frame 9 is required. It is possible to replace the joint 7 between the base 3 and the pendulum frame 9 by a commercially manufactured product, e.g. a wheel hub of a trailer and a shaft related to it, and required wall-fastening accessories. To the shaft of the hub is connected the bent pendulum frame 9 according to the invention which extends as the brush frame 10 according to the invention.

The profile of the pendulum frame 9 can be some other than circular, e.g. oval or rectangular. It is also possible that the pendulum frame 9 is shaped of a plate and assembled by welding or bolting.

Instead of a lifting lug 8, it is possible to manufacture e.g. an opening for the lifting accessory in the pendulum frame 9.

Instead of a welding connection, the connection between the pendulum frame 9 and the brush frame 10 can be formed releasable, e.g. by a bolt or screw fastening.

Instead of the up-turning catch 6, the up-locking of the brush section 20 can be implemented e.g. by setting a pin to a concentric hole formed in the base and the frame section.

The inventive functionality enables the fact that the diameter and length of the bristle section 11 are variable in connection with the manufacture of the device e.g. in accordance with animal species, animal breed or animal size. The shape can also be some other than cylindrical, e.g. angular, conical, spherical or asymmetrical in relation to the centre axis of the brush frame.

The most advantageous embodiments of the invention were described above. However, the invention is not solely limited to those but can vary in different ways within the scope of the claims.

The invention claimed is:

1. A brush device for animals without an actuator connected to the brush device, which brush device is intended for fixed installation in the construction of an animal shed for animals to use independently, which brush device
    comprise a base for fastening the brush device to a wall, a column or some other structure,
    a pendulum frame diverging from the base made such that it extends out of the base and to it is fastened a bristle section against which animals rub up, and
    between the base and the pendulum frame diverging from it, there is a joint enabling the pendulum-like rotational motion of a brush section around a rotation axis.

2. A brush device for animals according to claim 1, in which
    bending resistance of the pendulum frame is so high that animals using the brush device cannot enforce its deformation,
    and the pendulum frame is designed such that a brush frame fastened as its extension seeks clearly observed its way gravitationally downwards in free rotation.

3. A brush device for animals according to claim 1, in which
    the brush section is arranged to rotate limitlessly around the rotation axis.

4. A brush device for animals according to claim 1, in which the pendulum frame is manufactured of a pipe or bar and bent to its shape.

5. A brush device for animals according to claim 1, in which the brush section is up-turnable and lockable in the upper position.

6. A brush device for animals according claim 1, in which
    the brush device includes a fastening point for a lifting accessory for facilitating the installation and removal of the brush device.

7. A brush device for animals according claim 1, in which
    an opening has been formed in the pendulum frame for fastening the lifting accessory.

8. A brush device for animals according to claim 1, in which
    the base includes an installation perforation enabling direct fastening on the surface.

9. A brush device for animals according to claim 1, in which
    the base includes fastening points, using which, the brush device is installable to a circular pipe using special fasteners.

\* \* \* \* \*